R. ROYER.
Middlings-Purifiers.

No. 149,683. Patented April 14, 1874.

WITNESSES.

INVENTOR.
R. Royer
BY
ATTORNEYS.

UNITED STATES PATENT OFFICE.

REUBEN ROYER, OF EPHRATA, PENNSYLVANIA.

IMPROVEMENT IN MIDDLINGS-PURIFIERS.

Specification forming part of Letters Patent No. 149,683, dated April 14, 1874; application filed February 28, 1874.

*To all whom it may concern:*

Be it known that I, REUBEN ROYER, of Ephrata, in the county of Lancaster and State of Pennsylvania, have invented a new and Improved Middlings-Purifier, of which the following is a specification:

The invention will first be fully described, and then pointed out in the claim.

Figure 1:
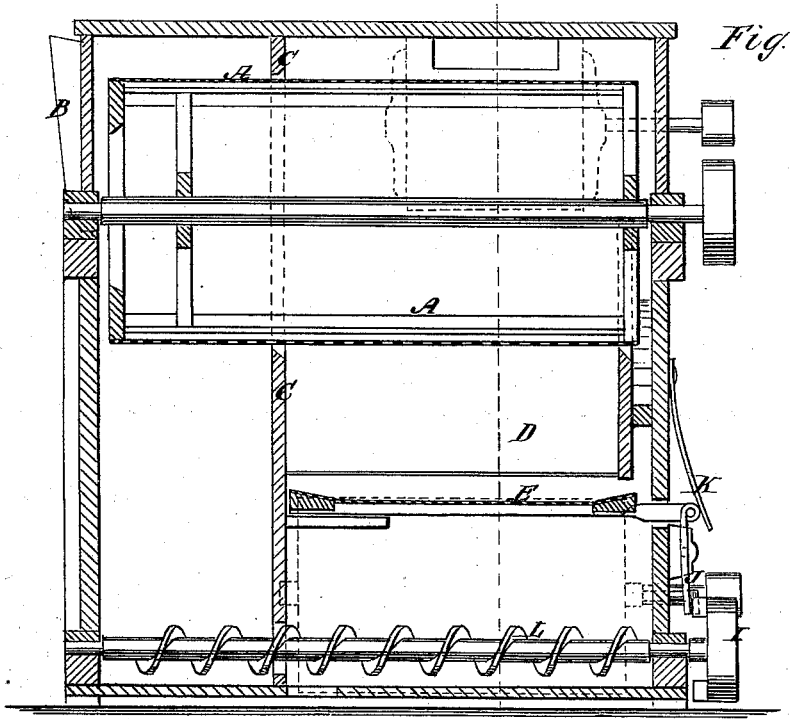
Figure 2:
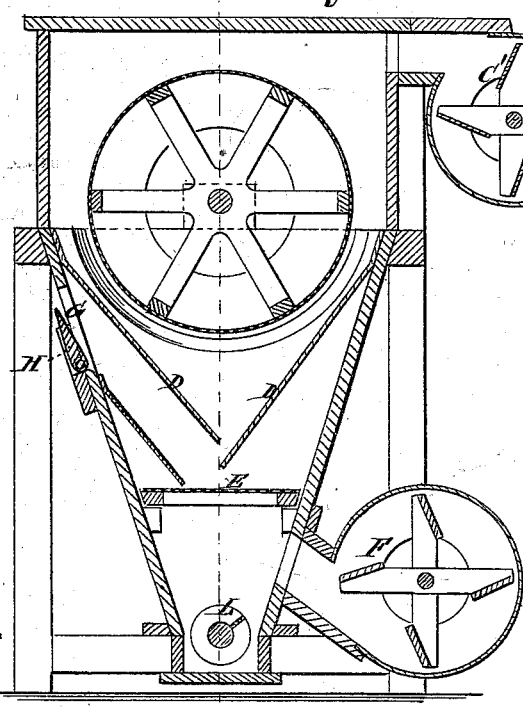
Figure 3:
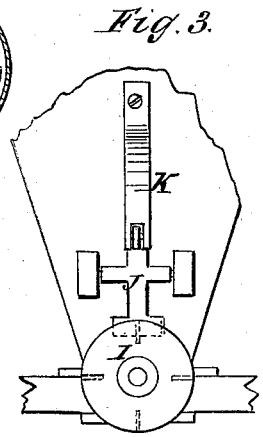

Figure 1 is a longitudinal sectional elevation of my improved middlings-purifier, taken on the line $x\ x$ of Fig. 2. Fig. 2 is a transverse sectional elevation taken on the line $y\ y$, Fig. 1; and Fig. 3 is a detail, in elevation, showing the method of operating the reciprocating sieve.

Similar letters of reference indicate corresponding parts.

A is the reel, which receives the middlings through the spout B. C is a partition in the chest, cutting off returns before the middlings are taken off. C' is the fan blowing into the chest upon the reel to cool and clear it; D, chutes forming a hopper below the reel to discharge the middlings onto the reciprocating sieve E, and for preventing the blast from the fan below from blowing up into the reel-space.

The blast from fan C' also aids to prevent the blast from the lower fan from passing upward. F is the fan at the bottom of the chest, blowing in through one side of the chest, up through the sieve E, and out at the other side through passage G, which is regulated by a valve, H, to control the blast. The fan F and the passage G are as long as the sieve, to cause the blast to act alike throughout the length of the sieve, by which the action is uniform and very efficient in separating the light fuzzy matters which do not contain flour, but discolor it when reground with the middlings. The sieve is operated by a cam-wheel, I, rock-lever J, and spring K, the cam being also the pulley for driving the conveyer L.

Having thus described my invention, I claim as new and desire to secure by Letters Patent—

The combination of fan C', reel A, hopper D, reciprocating sieve E, fan F, and passage G, as and for the purpose specified.

REUBEN ROYER.

Witnesses:
 FRANK K. ROYER,
 JOHN SELDOMRIDGE.